(12) United States Patent
Balasubramanian et al.

(10) Patent No.: US 11,921,763 B2
(45) Date of Patent: Mar. 5, 2024

(54) METHODS AND SYSTEMS TO PARSE A SOFTWARE COMPONENT SEARCH QUERY TO ENABLE MULTI ENTITY SEARCH

(71) Applicant: Open Weaver Inc., Miami, FL (US)

(72) Inventors: Ashok Balasubramanian, Chennai (IN); Karthikeyan Krishnaswamy Raja, Chennai (IN); Arul Reagan S, Chengalpattu District (IN)

(73) Assignee: Open Weaver Inc., Miami, FL (US)

( * ) Notice: Subject to any disclaimer, the term of this patent is extended or adjusted under 35 U.S.C. 154(b) by 0 days.

(21) Appl. No.: 17/678,920

(22) Filed: Feb. 23, 2022

(65) Prior Publication Data

US 2022/0269706 A1 Aug. 25, 2022

Related U.S. Application Data

(60) Provisional application No. 63/153,220, filed on Feb. 24, 2021.

(51) Int. Cl.
*G06F 16/00* (2019.01)
*G06F 16/33* (2019.01)
*G06F 16/335* (2019.01)

(52) U.S. Cl.
CPC ...... *G06F 16/3335* (2019.01); *G06F 16/3334* (2019.01); *G06F 16/335* (2019.01)

(58) Field of Classification Search
CPC . G06F 16/3335; G06F 16/3334; G06F 16/335
See application file for complete search history.

(56) References Cited

U.S. PATENT DOCUMENTS

| 5,953,526 A | 9/1999 | Day et al. |
| 7,322,024 B2 | 1/2008 | Carlson et al. |

(Continued)

FOREIGN PATENT DOCUMENTS

| CN | 108052442 A | 5/2018 |
| KR | 10-2020-0062917 | 6/2020 |

(Continued)

OTHER PUBLICATIONS

Lampropoulos et al, "REACT—A Process for Improving Open-Source Software Reuse", IEEE, pp. 251-254 (Year: 2018).

(Continued)

*Primary Examiner* — Syed H Hasan
(74) *Attorney, Agent, or Firm* — Foley & Lardner LLP

(57) ABSTRACT

Systems and methods for parsing a software component search query to enable multi entity searches are provided. An exemplary method includes filtering a search query for unwanted characters, correcting a spelling of the search query, applying a first machine learning model to remove filter terms from the search query, parsing the query to extract entities, categorizing the entities as natural language, programming language, or keyword text, applying a second machine learning model to enhance search characteristics of the entities characterized as natural language, applying a third machine learning model to enhance search characteristics of the entities characterized as programming language, applying a fourth machine learning model to enhance search characteristics of the entities categorized as keyword text, consolidating the enhanced entities into an enhanced search query, applying a fifth machine learning model to determine intended sources for the search query, and searching the intended sources for results.

20 Claims, 10 Drawing Sheets

(56) References Cited

U.S. PATENT DOCUMENTS

| | | | |
|---|---|---|---|
| 7,703,070 B2 | 4/2010 | Bisceglia | |
| 7,774,288 B2 | 8/2010 | Acharya et al. | |
| 7,958,493 B2 | 6/2011 | Lindsey et al. | |
| 8,010,539 B2 | 8/2011 | Blair-Goldensohn et al. | |
| 8,051,332 B2 | 11/2011 | Zakonov et al. | |
| 8,112,738 B2 | 2/2012 | Pohl et al. | |
| 8,112,744 B2 | 2/2012 | Geisinger | |
| 8,219,557 B2 | 7/2012 | Grefenstette et al. | |
| 8,296,311 B2 | 10/2012 | Rapp et al. | |
| 8,412,813 B2 | 4/2013 | Carlson et al. | |
| 8,417,713 B1 | 4/2013 | Blair-Goldensohn et al. | |
| 8,452,742 B2 | 5/2013 | Hashimoto et al. | |
| 8,463,595 B1 | 6/2013 | Rehling et al. | |
| 8,498,974 B1 | 7/2013 | Kim et al. | |
| 8,627,270 B2 | 1/2014 | Fox et al. | |
| 8,677,320 B2 | 3/2014 | Wilson et al. | |
| 8,688,676 B2 | 4/2014 | Rush et al. | |
| 8,838,606 B1 | 9/2014 | Cormack et al. | |
| 8,838,633 B2 | 9/2014 | Dhillon et al. | |
| 8,935,192 B1 | 1/2015 | Ventilla et al. | |
| 8,943,039 B1 | 1/2015 | Grieselhuber et al. | |
| 9,015,730 B1 | 4/2015 | Allen et al. | |
| 9,043,753 B2 | 5/2015 | Fox et al. | |
| 9,047,283 B1 | 6/2015 | Zhang et al. | |
| 9,135,665 B2 | 9/2015 | England et al. | |
| 9,176,729 B2 | 11/2015 | Mockus et al. | |
| 9,201,931 B2 | 12/2015 | Lightner et al. | |
| 9,268,805 B2 | 2/2016 | Crossley et al. | |
| 9,330,174 B1 | 5/2016 | Zhang | |
| 9,361,294 B2 | 6/2016 | Smith | |
| 9,390,268 B1 | 7/2016 | Martini et al. | |
| 9,471,559 B2 | 10/2016 | Castelli et al. | |
| 9,589,250 B2 | 3/2017 | Palanisamy et al. | |
| 9,626,164 B1 | 4/2017 | Fuchs | |
| 9,672,554 B2 | 6/2017 | Dumon et al. | |
| 9,977,656 B1 | 5/2018 | Mannopantar et al. | |
| 10,484,429 B1 | 11/2019 | Fawcett et al. | |
| 10,761,839 B1 | 9/2020 | Migoya et al. | |
| 10,922,740 B2 | 2/2021 | Gupta et al. | |
| 11,294,984 B2 | 4/2022 | Kittur et al. | |
| 11,334,351 B1 | 5/2022 | Pandurangarao et al. | |
| 11,461,093 B1 | 10/2022 | Edminster et al. | |
| 11,474,817 B2 | 10/2022 | Sousa et al. | |
| 2001/0054054 A1* | 12/2001 | Olson | G06F 16/9535 718/1 |
| 2002/0059204 A1* | 5/2002 | Harris | G06F 16/256 |
| 2002/0150966 A1* | 10/2002 | Muraca | G01N 33/5088 702/19 |
| 2002/0194578 A1 | 12/2002 | Irie et al. | |
| 2004/0243568 A1 | 12/2004 | Wang et al. | |
| 2006/0090077 A1 | 4/2006 | Little et al. | |
| 2006/0200741 A1 | 9/2006 | Demesa et al. | |
| 2006/0265232 A1 | 11/2006 | Katariya et al. | |
| 2007/0050343 A1 | 3/2007 | Siddaramappa et al. | |
| 2007/0185860 A1 | 8/2007 | Lissack | |
| 2007/0234291 A1 | 10/2007 | Ronen et al. | |
| 2007/0299825 A1 | 12/2007 | Rush et al. | |
| 2009/0043612 A1 | 2/2009 | Szela et al. | |
| 2009/0319342 A1 | 12/2009 | Shilman et al. | |
| 2010/0106705 A1* | 4/2010 | Rush | G06F 8/36 707/723 |
| 2010/0121857 A1 | 5/2010 | Elmore et al. | |
| 2010/0174670 A1 | 7/2010 | Malik et al. | |
| 2010/0205198 A1* | 8/2010 | Mishne | G06F 16/951 707/E17.014 |
| 2010/0205663 A1 | 8/2010 | Ward et al. | |
| 2010/0262454 A1 | 10/2010 | Sommer et al. | |
| 2011/0231817 A1 | 9/2011 | Hadar et al. | |
| 2012/0143879 A1 | 6/2012 | Stoitsev | |
| 2012/0259882 A1 | 10/2012 | Thakur et al. | |
| 2012/0278064 A1 | 11/2012 | Leary et al. | |
| 2013/0103662 A1 | 4/2013 | Epstein | |
| 2013/0117254 A1 | 5/2013 | Manuel-Devadoss et al. | |
| 2013/0326469 A1 | 12/2013 | Fox et al. | |
| 2014/0040238 A1 | 2/2014 | Scott et al. | |
| 2014/0075414 A1 | 3/2014 | Fox et al. | |
| 2014/0163959 A1 | 6/2014 | Hebert et al. | |
| 2014/0188746 A1 | 7/2014 | Li | |
| 2014/0297476 A1 | 10/2014 | Wang et al. | |
| 2014/0337355 A1 | 11/2014 | Heinze | |
| 2015/0127567 A1 | 5/2015 | Menon et al. | |
| 2015/0220608 A1 | 8/2015 | Crestani Campos et al. | |
| 2015/0331866 A1* | 11/2015 | Shen | G06F 16/95 707/723 |
| 2016/0253688 A1 | 9/2016 | Nielsen et al. | |
| 2016/0350105 A1 | 12/2016 | Kumar et al. | |
| 2016/0378618 A1 | 12/2016 | Cmielowski et al. | |
| 2017/0034023 A1 | 2/2017 | Nickolov et al. | |
| 2017/0063776 A1 | 3/2017 | Nigul | |
| 2017/0154543 A1 | 6/2017 | King et al. | |
| 2017/0220633 A1 | 8/2017 | Porath et al. | |
| 2017/0286541 A1 | 10/2017 | Mosley et al. | |
| 2017/0286548 A1 | 10/2017 | De et al. | |
| 2018/0046609 A1 | 2/2018 | Agarwal et al. | |
| 2018/0067836 A1 | 3/2018 | Apkon et al. | |
| 2018/0114000 A1 | 4/2018 | Taylor | |
| 2018/0329883 A1 | 11/2018 | Leidner et al. | |
| 2018/0349388 A1 | 12/2018 | Skiles et al. | |
| 2019/0278933 A1 | 9/2019 | Bendory et al. | |
| 2019/0286683 A1 | 9/2019 | Kittur et al. | |
| 2019/0311044 A1 | 10/2019 | Xu et al. | |
| 2019/0324981 A1* | 10/2019 | Counts | G06F 40/216 |
| 2020/0110839 A1 | 4/2020 | Wang et al. | |
| 2020/0125482 A1 | 4/2020 | Smith et al. | |
| 2020/0133830 A1 | 4/2020 | Sharma et al. | |
| 2020/0293354 A1 | 9/2020 | Song et al. | |
| 2020/0348929 A1 | 11/2020 | Sousa et al. | |
| 2020/0356363 A1 | 11/2020 | Dewitt et al. | |
| 2021/0049091 A1 | 2/2021 | Hikawa et al. | |
| 2021/0141863 A1 | 5/2021 | Wu et al. | |
| 2021/0149668 A1 | 5/2021 | Gupta et al. | |
| 2021/0349801 A1 | 11/2021 | Rafey | |
| 2021/0357210 A1 | 11/2021 | Clement et al. | |
| 2021/0382712 A1 | 12/2021 | Richman et al. | |
| 2022/0012297 A1 | 1/2022 | Basu et al. | |
| 2022/0083577 A1 | 3/2022 | Yoshida et al. | |
| 2022/0215068 A1 | 7/2022 | Kittur et al. | |
| 2022/0261241 A1 | 8/2022 | Balasubramanian et al. | |
| 2022/0269580 A1 | 8/2022 | Balasubramanian et al. | |
| 2023/0308700 A1 | 9/2023 | Perez | |

FOREIGN PATENT DOCUMENTS

| | | |
|---|---|---|
| WO | WO-2007/013418 A1 | 2/2007 |
| WO | WO-2020/086773 A1 | 4/2020 |

OTHER PUBLICATIONS

Leclair et al., "A Neural Model for Generating Natural Language Summaries of Program Subroutines," Collin McMillan, Dept. of Computer Science and Engineering, University of Notre Dame Notre Dame, IN, USA, Feb. 5, 2019.

Schweik et al, Proceedings of the OSS 2011 Doctoral Consortium, Oct. 5, 2011, Salvador, Brazil, pp. 1-100, Http:/Avorks.bepress.com/charles_schweik/20 (Year: 2011).

Stanciulescu et al, "Forked and Integrated Variants in an Open-Source Firmware Project", IEEE, pp. 151-160 (Year: 2015).

Zaimi et al, ":An Empirical Study on the Reuse of Third-Party Libraries in Open-Source Software Development", ACM, pp. 1-8 (Year: 2015).

Iderli Souza, An Analysis of Automated Code Inspection Tools for PHP Available on Github Marketplace, Sep. 2021, pp. 10-17 (Year: 2021).

Khatri et al, "Validation of Patient Headache Care Education System (PHCES) Using a Software Reuse Reference Model", Journal of System Architecture, pp. 157-162 (Year: 2001).

Lotter et al, "Code Reuse in Stack Overflow and Popular Open Source Java Projects", IEEE, pp. 141-150 (Year: 2018).

Rothenberger et al, "Strategies for Software Reuse: A Principal Component Analysis of Reuse Practices", IEEE, pp. 825-837 (Year:2003).

(56) References Cited

OTHER PUBLICATIONS

Tung et al, "A Framework of Code Reuse in Open Source Software", ACM, pp. 1-6 (Year: 2014).

M. Squire, "Should We Move to Stack Overflow? Measuring the Utility of Social Media for Developer Support," 2015 IEEE/ACM 37th IEEE International Conference on Software Engineering, Florence, Italy, 2015, pp. 219-228, doi: 10.1109/ICSE.2015.150. (Year: 2015).

S. Bayati, D. Parson, T. Sujsnjak and M. Heidary, "Big data analytics on large-scale socio-technical software engineering archives," 2015 3rd International Conference on Information and Communication Technology (ICoICT), Nusa Dua, Bali, Indonesia, 2015, pp. 65-69, doi: 10.1109/ICoICT.2015.7231398. (Year: 2015).

* cited by examiner

METHODS AND SYSTEMS TO PARSE A SOFTWARE COMPONENT SEARCH QUERY TO ENABLE MULTI ENTITY SEARCH

CROSS-REFERENCE TO RELATED PATENT APPLICATION

This application claims the benefit of and priority to U.S. Provisional Patent Application No. 63/153,220 filed Feb. 24, 2021, the entire disclosure of which is incorporated by reference herein.

TECHNICAL FIELD

The present disclosure relates to methods and systems for searching software components based on user queries.

BACKGROUND

There are over 40 million software components available in the public domain. For a developer to find a component to use from this vast collection is extremely time consuming and error prone. To find something that is unique, which is the primary reason to use a search engine, the developer must either create multiple focused queries and review the results or create a longer query with all of her requirements and expect to get millions of results that she has to review to find the right match.

While considering some of the systems and methods in the prior art, the above discussed drawbacks are evident. For example, United States Patent Application Publication Number 2007/0185860A1 discloses a system that compares two sets of database entries to prepare a list of indexed database entries based on similarity. The system is capable of providing a hypertext linked output displayed according to similarity or other user preferences, and the hypertext links are capable of querying a search engine providing links to resources related to the hypertext linked output. The user inputs a source document into the system for generating a related hypertext linked output. A process parses and indexes origin database entries and source database entries and compares some or all of the entries to create the hypertext linked output according to a weighting, such as determined by a similarity search system. However, the '860 publication is silent regarding parsing that divides the queries and enhances keyword usage.

United States Patent Application Publication Number 2007/0299825A1 discloses a method of operating a software search engine. The method includes populating a software code database from one or more sources of source code. The method also includes receiving a search query for a software code search engine. The method further includes searching the software code database with the search query. Moreover, the method includes presenting results of the searching. Additionally, the method includes tracking reuse of code portions of the software code database. Also, the method includes reporting on usage of code portions of the software code database. However, the '825 publication describes a regular expression based parsing technique, which does not divide the queries or enhance the keyword usage during the search process for the software components.

United States Patent Application Publication Number 2012/0259882A1 discloses a product search engine that uses web-crawling software to index textual webpage content from multiple internet sources. The product data obtained from the web-crawling process is then granulized by parsing methods into key words, such as, words and/or phrases. These components are compared with existing key words from search queries or webpage content. Each key word includes component tags, where the component tags map each component to product classification information in the form of structural parameters; and other product information such as, URLs, product images and product descriptions. When at least one matching key word is found, structural parameters are extracted from the matching components and assigned to the received key words. However, the '882 publication is silent regarding parsing via a machine learning model that is built from a software documentation and assets catering to software search specific need.

United States Patent Application Publication Number 2015/0220608A1 discloses a method of providing search results based on a search query. A search query including an entity and entity type is received. The entity is parsed into semantic components. Variants are generated based on input from auxiliary information and user configuration information for each of the semantic components. The entity is recomposed in different morphological forms from different variants of the semantic components. At least one morphological form for the entity is presented as a search result. However, the '608 publication is silent regarding parsing that divides the queries and enhances keyword usage.

United States Patent Application Publication Number 2017/0220633A1 discloses a modular visualization framework registers definitions for a variety of visualization types. The definitions are tagged with visualization characteristics. During a working session, likely interactive, a user identifies a search query used to produce data to be visualized. The working context, including the search query and data produced by its execution, is tagged for its visualization characteristics. Information about the working context, including its visualization characteristics, is then used to produce a customized list of candidates suited for the working context from which the user may select a visualization type. However, the '633 publication is silent regarding parsing that divides the queries and enhances keyword usage.

Based on the prior art examples described above, the present systems and methods disclose the use of multiple focused queries and associated multiple search results, which can become a cumbersome task for user to review each result and finalize. This creates significant delays in software development and can result in quality and security issues by not using the right components. This prompts the need for a system and a method that overcomes the issue of reviewing too many search results based on the multi focused queries from a user. There is a need for such a system and method that performs a search to find the right software components, thereby significantly reducing any delays in software development that may affect the quality and security of the process.

SUMMARY

The following presents a simplified summary of the subject matter in order to provide a basic understanding of some of the aspects of subject matter embodiments. This summary is not an extensive overview of the subject matter. It is not intended to identify key/critical elements of the embodiments or to delineate the scope of the subject matter. Its sole purpose to present some concepts of the subject matter in a simplified form as a prelude to the more detailed description that is presented later.

A system to parse a software component search query to enable multi entity search including at least one processor that operates under control of a stored program including a sequence of program instructions to control one or more components. The components comprise a Web GUI portal, an initial query entity parser, a technology keyword search processor, a technology keyword service, a natural language search processor, an editor and classifier service, a code search processor, an entity ranking and weight assigner, a multi search engine, and a software taxonomy crawler and builder. The Web GUI portal for a user or an external system submits a search request and to view corresponding results. The initial query entity parser is in communication with the Web GUI portal to split a query associated with the search request into entities. The technology keyword search processor is in communication with the initial query entity parser to anchor technology keyword enhancements associated with the search request.

The technology keyword service is in communication with the technology keyword search processor to enhance technology and framework keywords used in the search query. The natural language search processor is in communication with the technology keyword service to anchor natural language keyword enhancements associated with the search request. The editor and classifier service is in communication with the natural language search processor to enhance natural language keywords associated with the search request. The code search processor is in communication with the editor and classifier service to enhance programming language keywords associated with the search request. The entity ranking and weight assigner is in communication with the code search processor to assign weights to search entities associated with the search request. The multi search engine is in communication with the entity ranking and weight assigner to execute multiple searches in parallel based on the search entities. The software taxonomy crawler and builder is in communication with the multi search engine to process different software component details based on the search entities.

In an embodiment, the Web GUI portal is configured to accept the search request for software components, accept the search query in multiple languages and with a combination of technology natural language and programming language, display multi-source search results and match scoring to the user post the processing, and interact with an external system instead of a user. In an embodiment, the initial query entity parser is configured to use machine learning techniques to split the query into multiple search entities, wherein the search entities comprise software component technologies, framework terms, words that pertain to software component source code across multiple programming languages, and words that pertain to natural language across multiple languages.

In an embodiment, the technology keyword search processor is configured to process and submit the technology and framework search entities to the entity ranking and weight assigner. In an embodiment, the Technology Keyword Service is configured to use machine learning techniques to enhance the technology and framework keywords used in the search query, remove redundant terms, adds qualifiers including version numbers and additional framework descriptors, and prioritizes must have keywords critical to search context and result, and leverage the software taxonomy crawler and builder to lookup relevant technology terms.

In an embodiment, the natural language search processor is configured to anchor the natural language keyword enhancements and process and submit the search entities to the entity ranking and weight assigner.

In an embodiment, the editor and classifier service is configured to use machine learning techniques to enhance the natural language keywords present in the search query in the context of a software component search, and remove redundant terms, identifies business and industry domains, completes and corrects terms, and identifies software component usage and intent using the appropriate verbs in the search query and features requested through adjectives in the natural language. In an embodiment, the editor and classifier service is also configured to support widely used languages including English, French, German, and Spanish, and leverage the software taxonomy crawler and builder to lookup relevant software component based natural language terms.

In an embodiment, the code search processor is configured to use machine learning techniques to enhance the programming language keywords, auto complete missing statements, corrects any syntactical errors in the statements, removes duplicates based on the different programming language structures, and support widely used programming languages including Java, Javascript, C#, Ruby, Python, and PHP. In an embodiment, entity ranking and weight assigner is configured to process the technology and framework, natural language, code search entities, use machine learning techniques to identify criticality of each entity and assigns a score between 0 and 1, wherein the weights of all the entities adds up to 1, and identify and mark the entities that must be present in the search result irrespective of the weights and also marks the entities that are applied as filters to the search.

In an embodiment, the Multi Search Engine is configured to apply filters required by the multi search engine based on the entities recognized and execute multiple searches in parallel based on the technology, natural language, and programming entities, which produces a combined result based on the weights of the entities. In an embodiment, the software taxonomy crawler is configured to process different software component details that are available in public like public code repositories including GitHub, GitLab, BitBucket, SourceForge, Cloud and API providers including Microsoft Azure, Amazon Web Services, Google Compute Platform, RapidAPI, software package managers including NPM and PyPi, public websites including product details page of the software component provider and Wikipedia. In an embodiment, the software taxonomy crawler is also configured to store the details into the file storage as code, syntax, framework and technology keywords, hierarchies, software component based natural language hierarchies, verbs, and adjectives.

One implementation of the present disclosure is a system for parsing a software component search query to enable multi entity searches. The system includes one or more processors and memory storing instructions that, when executed by the one or more processors, cause the one or more processors to perform operations. The operations include filtering a search query for a number of unwanted characters, applying a software dictionary of terms to correct the spelling of the search query, applying a first machine learning model to remove one or more filter terms from the search query, parsing the query to extract a number of entities, categorizing each of the number of entities as natural language, programming language, or keyword text, applying a second machine learning model to each of one or more entities categorized as natural language to enhance one or more search characteristics of the number of entities characterized as natural language, applying a third machine learning model to each of one or more entities categorized as programming language to enhance the one or more search characteristics of the number of entities characterized as programming language, applying a fourth machine learning model to each of one or more entities categorized as keyword text to enhance the one or more search characteristics of the number of entities categorized as keyword text, consolidating the number of enhanced entities into an enhanced search query, applying a fifth machine learning model to determine one or more intended sources for the search query, and searching the one or more intended sources for a number of results pertaining to the search query.

In some embodiments, the operations further include accepting a remote location of the search query via a web GUI portal that allows a user to input the search query.

In some embodiments, the operations include assigning a search weight to each of the number of entities based on the categorization of each of the number of entities, wherein searching the one or more sources for the number of results pertaining to the search query is prioritized based on each of the weights.

In some embodiments, the operations further include assigning a search weight to each of the one or more intended sources based on the number of entities, wherein searching the one or more sources for the number of results pertaining to the search query is prioritized based on each of the weights.

In some embodiments, the operations include identifying a technology category for the search query, wherein the technology category is applied to remove one or more of the intended sources for the search query that are not associated with the technology category.

In some embodiments, the fourth machine learning model is configured to remove one or more technology stop words.

In some embodiments, the operations include identifying a programming language for the search query, wherein the programming language is applied to remove one or more of the intended sources for the search query that are not associated with the technology category.

Another implementation of the present disclosure is a method for parsing a software component search query to enable multi entity searches. The method includes filtering a search query for a number of unwanted characters, applying a software dictionary of terms to correct the spelling of the search query, applying a first machine learning model to remove one or more filter terms from the search query, parsing the query to extract a number of entities, categorizing each of the number of entities as natural language, programming language, or keyword text, applying a second machine learning model to each of one or more entities categorized as natural language to enhance one or more search characteristics of the number of entities characterized as natural language, applying a third machine learning model to each of one or more entities categorized as programming language to enhance the one or more search characteristics of the number of entities characterized as programming language, applying a fourth machine learning model to each of one or more entities categorized as keyword text to enhance the one or more search characteristics of the number of entities categorized as keyword text, consolidating the number of enhanced entities into an enhanced search query, applying a fifth machine learning model to determine one or more intended sources for the search query, and searching the one or more intended sources for a number of results pertaining to the search query.

In some embodiments, method includes accepting a remote location of the search query via a web GUI portal that allows a user to input the search query.

In some embodiments, the method includes assigning a search weight to each of the number of entities based on the categorization of each of the number of entities, wherein searching the one or more sources for the number of results pertaining to the search query is prioritized based on each of the weights.

In some embodiments, the method includes assigning a search weight to each of the one or more intended sources based on the number of entities, wherein searching the one or more sources for the number of results pertaining to the search query is prioritized based on each of the weights.

In some embodiments, the method includes identifying a technology category for the search query, wherein the technology category is applied to remove one or more of the intended sources for the search query that are not associated with the technology category.

In some embodiments, the fourth machine learning model is configured to remove one or more technology stop words.

In some embodiments, the includes identifying a programming language for the search query, wherein the programming language is applied to remove one or more of the intended sources for the search query that are not associated with the technology category.

Another implementation of the present disclosure relates to one or more non-transitory computer-readable media for parsing a software component search query to enable multi entity searches. The non-transitory computer-readable media stores instructions thereon. The instructions, when executed by one or more processors, cause the one or more processors to filter a search query for a number of unwanted characters, apply a software dictionary of terms to correct the spelling of the search query, apply a first machine learning model to remove one or more filter terms from the search query, parse the query to extract a number of entities, categorize each of the number of entities as natural language, programming language, or keyword text, apply a second machine learning model to each of one or more entities categorized as natural language to enhance one or more search characteristics of the number of entities characterized as natural language, apply a third machine learning model to each of one or more entities categorized as programming language to enhance the one or more search characteristics of the number of entities characterized as programming language, apply a fourth machine learning model to each of one or more entities categorized as keyword text to enhance the one or more search characteristics of the number of entities categorized as keyword text, consolidate the number of enhanced entities into an enhanced search query, apply a fifth machine learning model to determine one or more intended sources for the search query, and search the one or more intended sources for a number of results pertaining to the search query.

In some embodiments, the instructions cause the one or more processors to accept a remote location of the search query via a web GUI portal that allows a user to input the search query.

In some embodiments, the instructions cause the one or more processors to assign a search weight to each of the number of entities based on the categorization of each of the number of entities, wherein searching the one or more sources for the number of results pertaining to the search query is prioritized based on each of the weights.

In some embodiments, the instructions cause the one or more processors to assign a search weight to each of the one or more intended sources based on the number of entities, wherein searching the one or more sources for the number of results pertaining to the search query is prioritized based on each of the weights.

In some embodiments, the instructions cause the one or more processors to identify a technology category for the search query, wherein the technology category is applied to remove one or more of the intended sources for the search query that are not associated with the technology category.

In some embodiments, the fourth machine learning model is configured to remove one or more technology stop words.

BRIEF DESCRIPTION OF THE DRAWINGS

The following drawings are illustrative of particular examples for enabling systems and methods of the present disclosure, are descriptive of some of the methods and mechanism, and are not intended to limit the scope of the invention. The drawings are not to scale (unless so stated) and are intended for use in conjunction with the explanations in the following detailed description.

Figure 1:
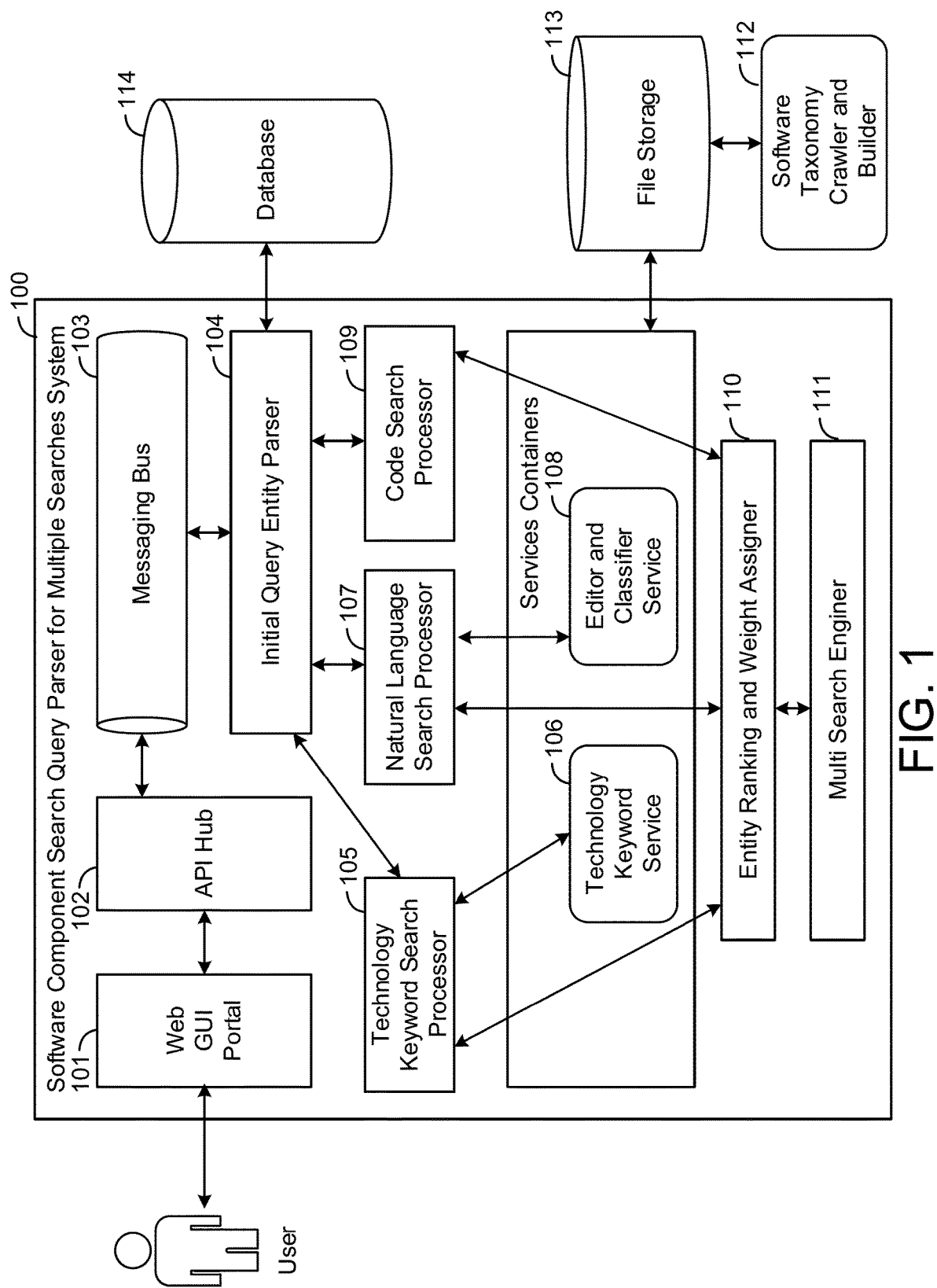
FIG. 1 shows a system architecture that parses a software component search query to enable multi entity search, according to some embodiments.

Persons skilled in the art will appreciate that elements in the figures are illustrated for simplicity and clarity and may represent both hardware and software components of the system. Further, the dimensions of some of the elements in the figure may be exaggerated relative to other elements to help to improve understanding of various exemplary embodiments of the present disclosure. Throughout the drawings, it should be noted that like reference numbers are used to depict the same or similar elements, features, and structures.

DETAILED DESCRIPTION

Exemplary embodiments now will be described. The disclosure may, however, be embodied in many different forms and should not be construed as limited to the embodiments set forth herein; rather, these embodiments are provided so that this disclosure will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

To alleviate this developer's software component search problem we have invented a solution that is able to take a complex and long developer search query with multiple requirements and enhance and split them to perform individual searches in parallel to provide a more accurate search result.

This will save significant time for the developer and also eliminate any manual errors and oversight related to manual review of thousands or millions of search results.

FIG. 1 shows a System 100 or a high-level architecture that parses a software component search query to enable multi-entity searches, according to some embodiments. Briefly, and as described in further detail below, the System 100 includes a Web GUI Portal 101, API Hub 102, Messaging Bus 103, Initial Query Entity Parser 104, Technology Keyword Search Processor 105, Technology Keyword Service 106, Natural Language Search Processor 107, Editor and Classifier Service 108, Code Search Processor 109, Entity Ranking and Weight Assigner 110, Multi Search Engine 111, Software Taxonomy Crawler and Builder 112, File Storage 113, and Database 114.

In the embodiment shown in FIG. 1, the System 100 includes the Web GUI Portal 101 which has a User Interface form for a user to interface with the System 100 for submitting different search requests and viewing their status. The Web GUI Portal 101 allows the user to submit requests for searching software components and viewing the generated results. For submitting a new request, user is presented with a form to provide the query that they would like to search for. The Web GUI portal 101 is configured to accept the search request for software components and accept the search query in multiple languages and with a combination of technology natural language and programming language. Furthermore, the Web GUI portal 101 is configured to display search results to the user post the processing. Alternatively, where automation is required, the Web GUI Portal 101 also interacts with an external system to provide the same information that the user would have provided.

In some embodiments, the submitted request from web portal goes to the API Hub 102, which acts as a gateway for accepting and transmitting all web service requests from the portal. The API Hub 102 hosts the web services for taking the requests and creating request messages to be put into the Messaging Bus 103. The Messaging Bus 103 provides for event driven architecture, thereby enabling long running processes to be decoupled from requesting system's calls. This decoupling may aid the System 100 to service the request and notify user once the entire process of parsing the software component query is completed. There are job listeners configured to listen to the messages in the Messaging Bus 103.

In some embodiments, the Initial Query Entity Parser 104 in communication with the Web GUI Portal 101 uses machine learning techniques to split the query into entities that pertain to software component technologies, framework terms, words that pertain to software component source code across multiple programming languages and words that pertain to natural language across multiple languages.

In some embodiments, the Technology Keyword Search Processor 105 in communication with the initial query entity parser 104 anchors the technology keyword enhancements. The Technology Keyword Search Processor 105 calls the Technology Keyword Service 106 to enhance the technology and framework keywords. The Technology Keyword Search Processor 105 then processes and submits the technology and framework search entities to the Entity Ranking and Weight Assigner 110.

In some embodiments, the Technology Keyword Service 106 in communication with the technology keyword search processor 105 uses machine learning techniques to enhance the technology and framework keywords used in the search query. The Technology Keyword Service 106 removes redundant terms, adds qualifiers, for example, version numbers, additional framework descriptors and prioritizes must have keywords critical to the search context and result. The Technology Keyword Service 106 leverages the Software Taxonomy Crawler and Builder 112 to lookup relevant technology terms.

In some embodiments, the Natural Language Search Processor 107 in communication with the Technology Keyword Service 106 anchors the natural language keyword enhancements. The Natural Language Search Processor 107 calls the Editor and Classifier Service 108 to enhance the natural language keywords. The Natural Language Search Processor 107 then processes and submits the natural language search entities to the Entity Ranking and Weight Assigner 110.

In some embodiments, the Editor and Classifier Service 108 in communication with the natural language search processor 107 uses machine learning techniques to enhance the natural language keywords present in the search query in the context of a software component search. The Editor and Classifier Service 108 removes redundant terms, identifies business and industry domains, completes and corrects terms, identifies the software component usage and intent using the appropriate verbs in the query and features requested through adjectives in the natural language. The Editor and Classifier Service 108 supports widely used languages, including, but not limited to English, French, German, Spanish, etc. The Editor and Classifier Service 108 leverages the Software Taxonomy Crawler and Builder 112 to lookup relevant software component based natural language terms.

In some embodiments, the Code Search Processor 109 in communication with the editor and classifier service 108 uses machine learning techniques to enhance the programming language keywords. The Code Search Processor 109 auto completes missing statements, corrects any syntactical errors in the statements, removes duplicates based on the different programming language structures. The Code Search Processor 109 supports widely used programming languages such as but not limited to Java, Javascript, C#, Ruby, Python, and PHP.

In some embodiments, the Entity Ranking and Weight Assigner 110 in communication with the code search processor 109 processes the technology and framework search entities from Technology Keyword Search Processor 105, the natural language search entities from Natural Language Search Processor 107, and the programming language search entities from Code Search Processor 109. The Entity Ranking and Weight Assigner 110 assigns weights to search entities associated with the search request. The Entity Ranking and Weight Assigner 110 uses machine learning techniques to identify the criticality of each entity and assigns a score between 0 and 1, wherein the weights of all the entities adds up to 1. The Entity Ranking and Weight Assigner 110 identifies and marks entities which must be present in the search result irrespective of the weights and also marks entities that are applied as filters to the search.

In some embodiments, the Multi Search Engine 111 in communication with the entity ranking and weight assigner 110 applies any filter required by the search engine based on the entities recognized and executes multiple searches in parallel based on the technology, natural language and programming entities and produces a combined result based on the entity weights.

In some embodiments, the Software Taxonomy Crawler and Builder 112 in communication with the Multi Search Engine 111 processes different software component details that are available in public like public code repositories including, but not limited to, GitHub, GitLab, BitBucket, SourceForge, Cloud and API providers including, but not limited to, Microsoft Azure, Amazon Web Services, Google Compute Platform, RapidAPI, software package managers including, but not limited to, NPM, PyPi etc., public websites including, but not limited to, the product details page of the software component provider, Wikipedia, etc. The Software Taxonomy Crawler and Builder 112 stores the details into the file storage as Code, syntax, framework and technology keywords, hierarchies, software component based natural language hierarchies, verbs, and adjectives.

In some embodiments, the File Storage 113 is used to store document type of data, source code files, keywords, dictionaries, hierarchies, documents, readme files, installation guides, marketing collateral, user guides, neural network models, etc.

In some embodiments, the Database 114 is a relational database management system (RDBMS) database like MySQL to store all meta-data pertaining to the requests received from the user, Messaging Bus 103, request processor, and from other system components described herein. The meta-data includes details of every request to identify who submitted it, requested details to track the progress as the System processes the request through its different tasks. The status of each execution step in whole process is stored in this database to track and notify the system on completion.

Figure 2:
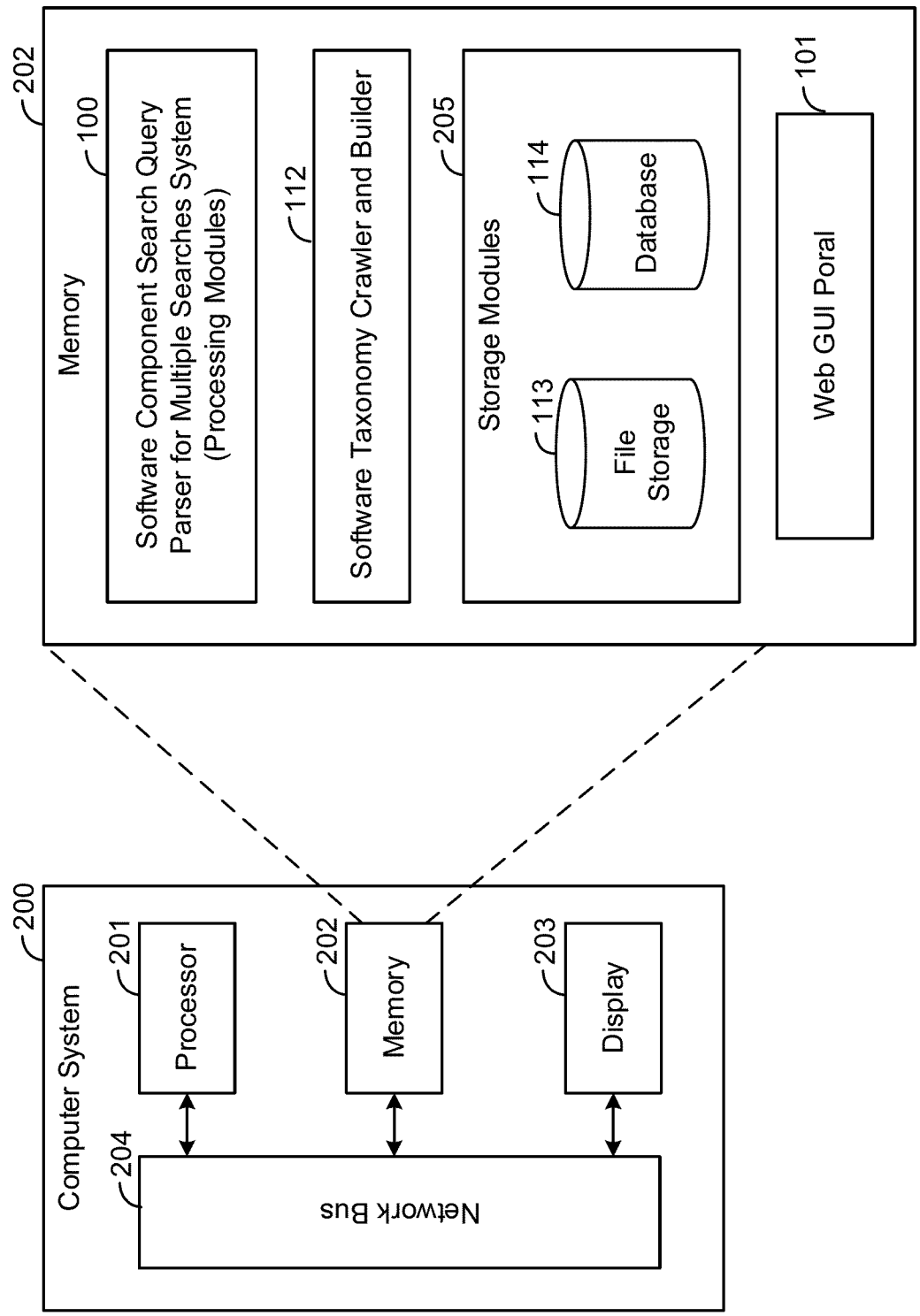
FIG. 2 shows an example computer system implementation to parse a software component search query to enable multi entity search, according to some embodiments.

FIG. 2 shows a block view of a System 200 configured for parsing a software component search query to enable multi-entity searches, according to some embodiments. The System 200 includes a Processor 201, Memory 202, Display 203, Network Bus 204, and other input/output including a mic, speaker, wireless card, etc. The System 200 includes processing modules for the System 100, File Storage 113, Database 114, and Web GUI Portal 101 stored in the memory 202 which provides the necessary machine instructions to the Processor 201 to perform the executions for parsing a software component search query to enable multi entity searches. In some embodiments, the Processor 201 controls the overall operation of the system and managing the communication between the components through the Network Bus 204. The Memory 202 holds system code, data and instructions of the processing module of the System 100 and may be of different types of non-volatile memory and volatile memory.

Figure 3:
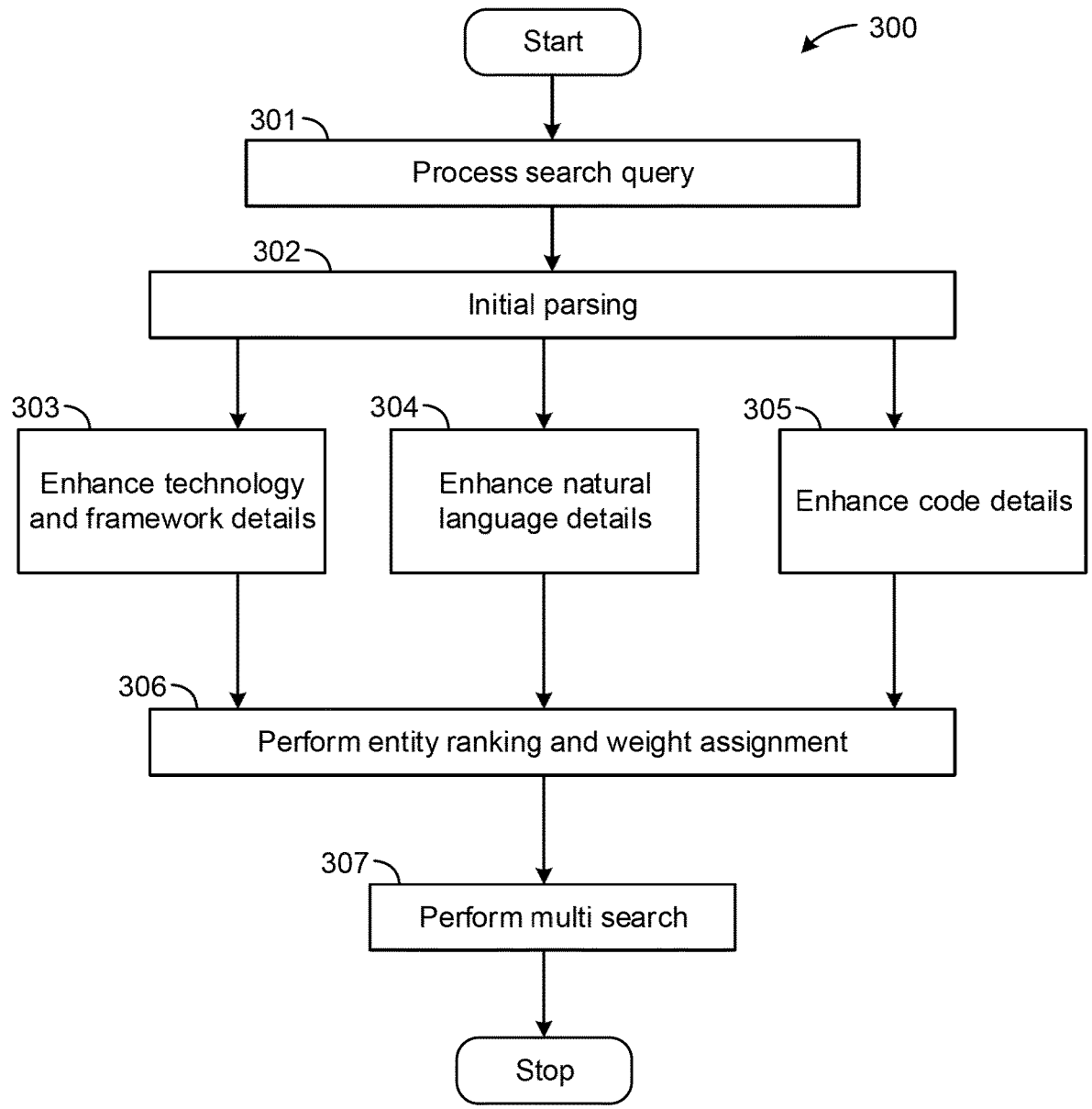
FIG. 3 shows the overall process flow of parsing a software component search query to enable multi entity search, according to some embodiments.

FIG. 3 shows the end-to-end process 300 to parse a software component search query to enable multi entity searches, according to some embodiments. In step 301, the input search query is captured from the user or an external system. The step 301 captures the input search query from the user or an external system. In step 302, the search query is split into technology based entities, natural language based entities, and programming language based code entities. In step 303, the technology entities are enhanced using machine learning techniques and their most critical phrases marked for prioritization. In step 304, the natural language entities are enhanced using machine learning techniques and their most critical phrases are marked for prioritization. In step 305, the code entities are enhanced. In step 306, the three entities are weighted based on their criticality to the whole search term. In step 307, a parallel search is performed across the three entities and the results are summarized based on the entity weights.

Figure 4:
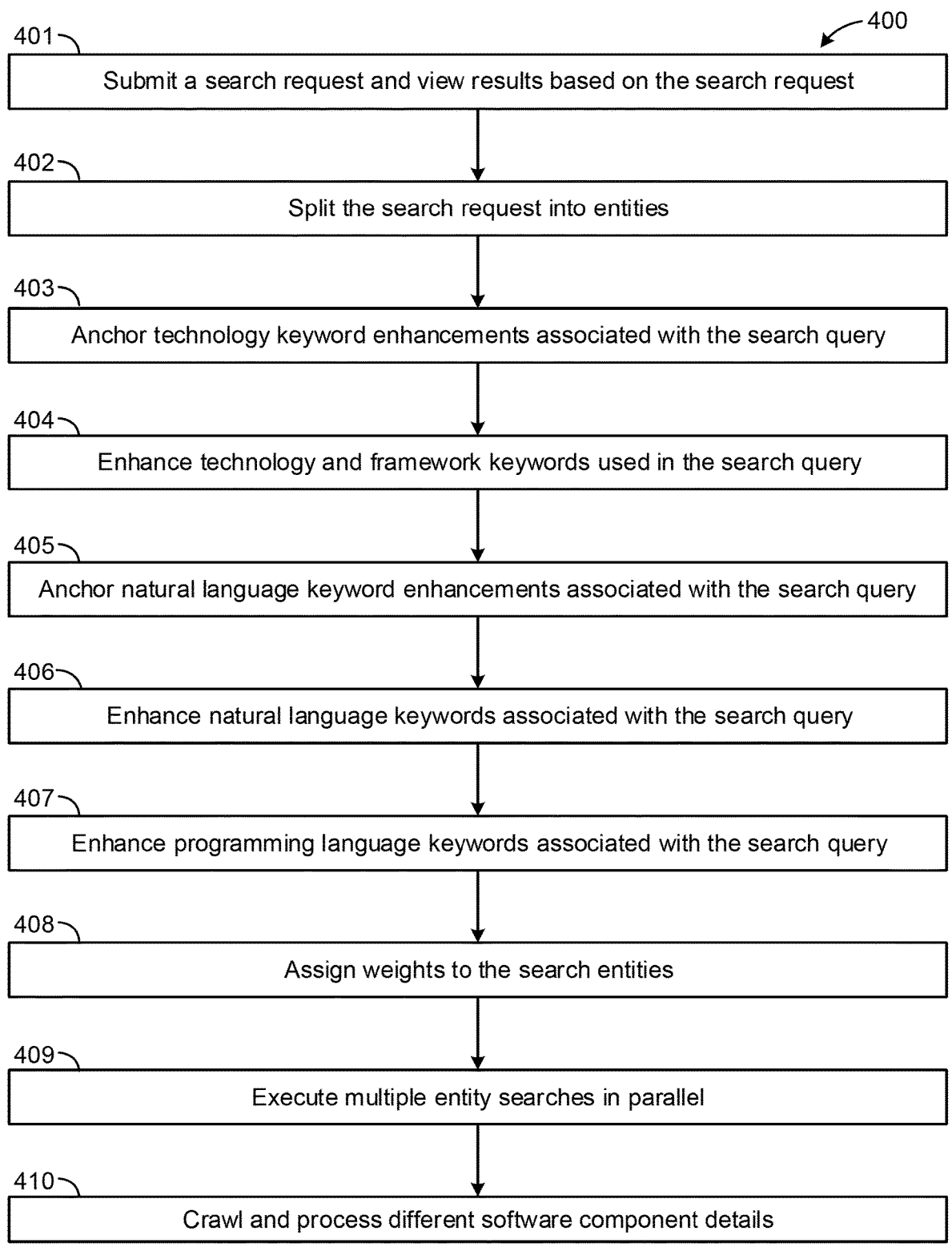
FIG. 4 shows the overall method flow of parsing a software component search query to enable multi entity search, according to some embodiments.

FIG. 4 shows the overall flow 400 of parsing a software component search query to enable multi entity searches, according to some embodiments. Here, Processor 201 may operate under control of a stored program including a sequence of program instructions to parse the software component search query to enable multi entity search. Step 401 includes submitting a search request and viewing corresponding results. Step 402 includes splitting the search query associated with the search request into entities. Step 403 includes anchoring technology keyword enhancements associated with the search query. Step 404 includes enhancing technology and framework keywords used in the search query. Step 405 includes anchoring natural language keyword enhancements associated with the search query. Step 406 includes enhancing natural language keywords associated with the search query. Step 407 includes enhancing programming language keywords associated with the search query. Step 408 includes assigning weights to the search entities associated with the search query. Step 409 includes executing multiple entity searches in parallel. Step 410 includes crawling and processing different software component details.

Figure 5:
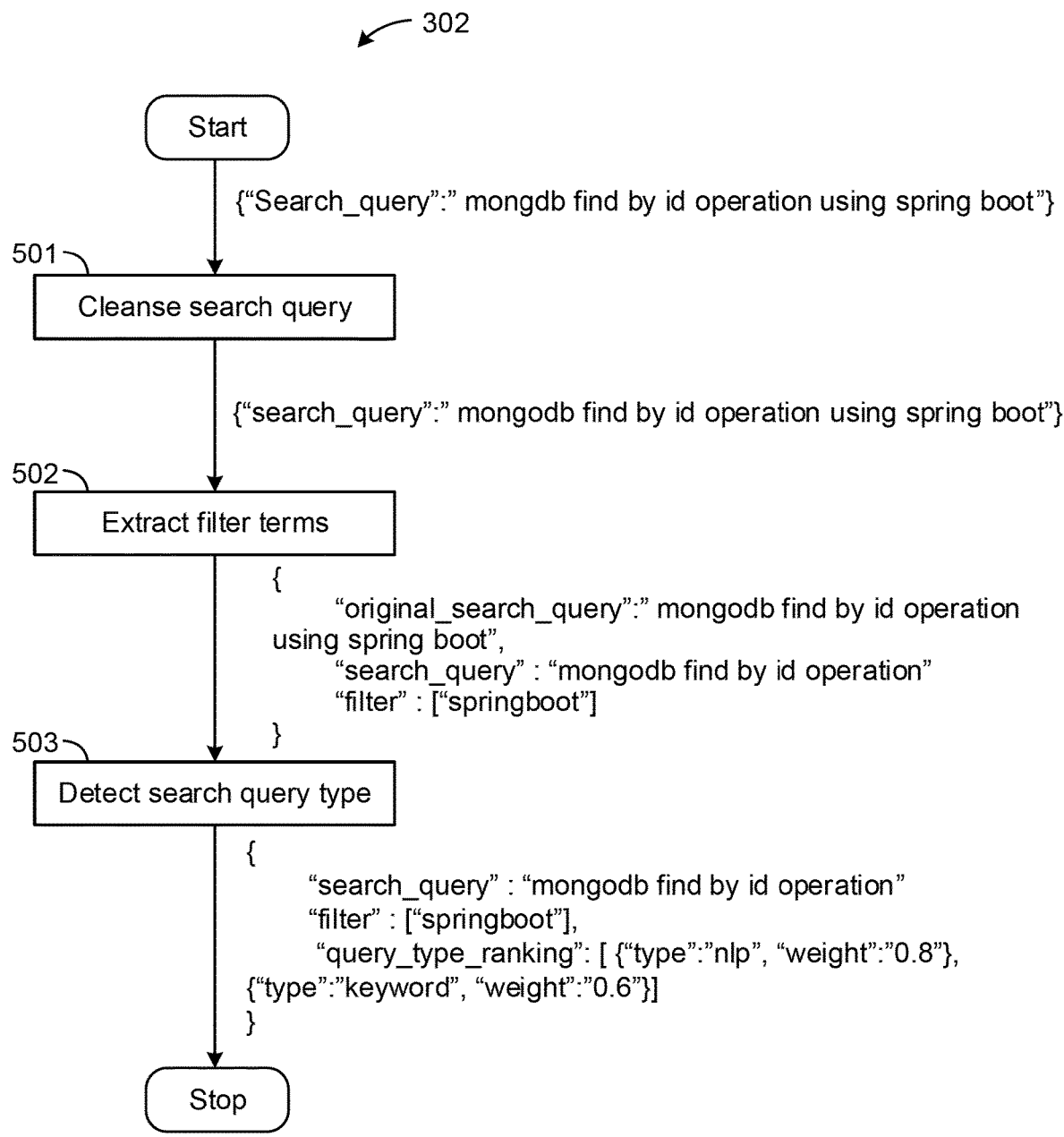
FIG. 5 illustrates a flow diagram on how the software search query can be cleaned, filter terms extracted, and type of query identified, according to some embodiments.

FIG. 5 illustrates step 302 of process 300 in greater detail, depicting how the software search query can be cleaned, extracted of filter terms, and how the type of query can be identified, according to some embodiments. In step 501 unwanted characters are removed from the search query including leading spaces, trailing spaces, etc. Step 501 also involves the software dictionary generated from the source code and library documentation to do spell correction on the search query. For example, if the search query "mongdb find by id operation using spring boot" query is passed to the System 100 then, in step 501 the spelling is corrected from "mongdb" to "mongodb" in the search query.

In some embodiments, in step 502, a machine learning model trained on specific set of software search queries is used to identify a filter term from the search query. For example, if "mongdb find by id operation using spring boot" is received as a query then "spring boot" is identified as a filter term. This filter term "spring boot" is used as a filter while searching in downstream sources. Step 502 produces three output fields; original search text, search text with filter term removed from the original search text and filter field where the filter term will be stored.

In some embodiments, in step 503 a machine learning and natural language processing technique is used to identify if the search query is of type keyword text or natural language or programming language code. First, the search query is passed into a machine learning based code detector model, which is trained on software source code of different programming languages retrieved from the public repositories such as GitHub, Gitlab, etc. If the passed search query is a programming language code, for example, List1s=new ArrayList( )), then the code detector model identifies it as of type "code" and assigns a weight, for example, 0.9. If the search query is of natural language with semantic logic present, then a natural language processing technique is used to identify if the query is of type "nlp." If the search query is not identified as natural language query then the search query is flagged as of type "keyword." Step 503 produces three output fields including: search text with filter term removed from the original search text, filter field, and query type ranking field with query types such as "code," "nlp," and "keyword" and query type weights.

Figure 6:
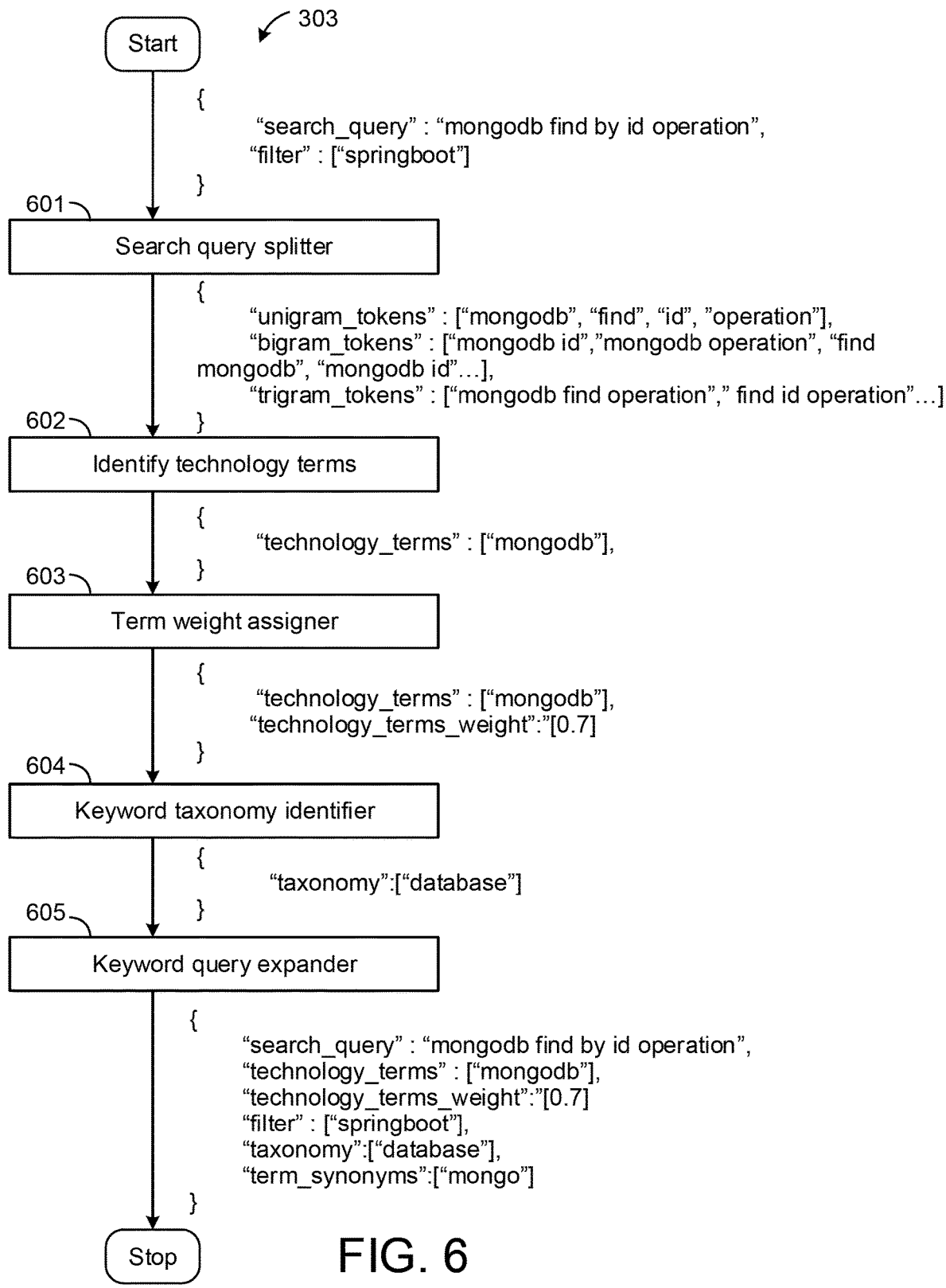
FIG. 6 illustrates a flow diagram of how a keyword type of query can parsed for software search need, according to some embodiments.

FIG. 6 illustrates step 303 of process 300 in greater detail, depicting how a keyword type of query can be parsed for a software component search, according to some embodiments. In step 601, technology stop words, for example, "library", "framework", "solution", etc., as well as natural language stop words, for example, "the," "a," etc., are removed from the search query and converted to tokens. Step 601 creates three type of tokens; unigram, bigram and trigram. For example, if a search query "mongodb find by id operation" is passed, technology stop word "by" will be removed from the search query. The final search query looks like "mongodb find by id operation". Following stop word removal, in step 601 unigram tokens are created, for example, "mongodb," "find," "id" and "operation." Following unigram token creation, in step 601, bigram tokens are created from the search query e.g., "mongodb id," "mongodb operation," "find mongodb," "mongodb id," etc. Following bigram token creation, in step 601, trigram tokens are created from the search query e.g., "mongodb find operation," "find id operation," etc. Step 601 produces three outputs; unigram token, bigram token and trigram token.

In some embodiments, in step 602, technology and framework details are enhanced, as suggested above in regards to step 303 depicted in FIG. 3. In step 602 a software technology dictionary built from software technology documents such as a readme file is used to identify the technology terms present in the tokens from step 601. For example, from the unigram tokens ("mongodb," "find," "id," "operation") "mongodb" is identified as technology term.

In some embodiments, in step 603, weights are assigned to the identified technology terms as part of enhancing technology and framework details. If the term is unigram, a weight of 0.7 is given. If the term is bigram, a weight of 0.8 will be given. If the term is trigram, a weight of 0.9 will be given. For example, in the search query tokens from step 602, "mongodb" was identified as technology term. Since the identified technology term is unigram a weight of 0.7 is assigned.

In some embodiments, in step 604, as part of enhancing technology and framework details, a machine learning technique is used to identify technology category (e.g., keyword taxonomy) of the search query based on multi label classification model trained on the technology documentation such as readme file, technology question and answer websites. For example, for the search query "mongodb find by id operation" taxonomy is identified as "database." This taxonomy helps to narrow the scope of search in the multi-source search process.

In some embodiments, in step 605, as part of enhancing technology and framework details, a low-level search query for the downstream search data source is built through keyword expansion. In step, 605 the actual search query is expanded with technology synonyms, which is built from technology documentation and public technology question and answer websites. For example, in the search query "mongodb find by id operation," for the technology term "mongodb" a synonym "mongo" is identified and the search query is expanded with the identified synonyms. Step 605 produces six output fields; a search text with the filer term removed from the search text; a technology term, which is a must-have term in the search result; a technology term weight that influences the search result relevancy; a filter that helps to narrow down the search process; a taxonomy that further narrows down the search process; a relevance ranking; and term synonyms that helps to expand the search text.

Figure 7:
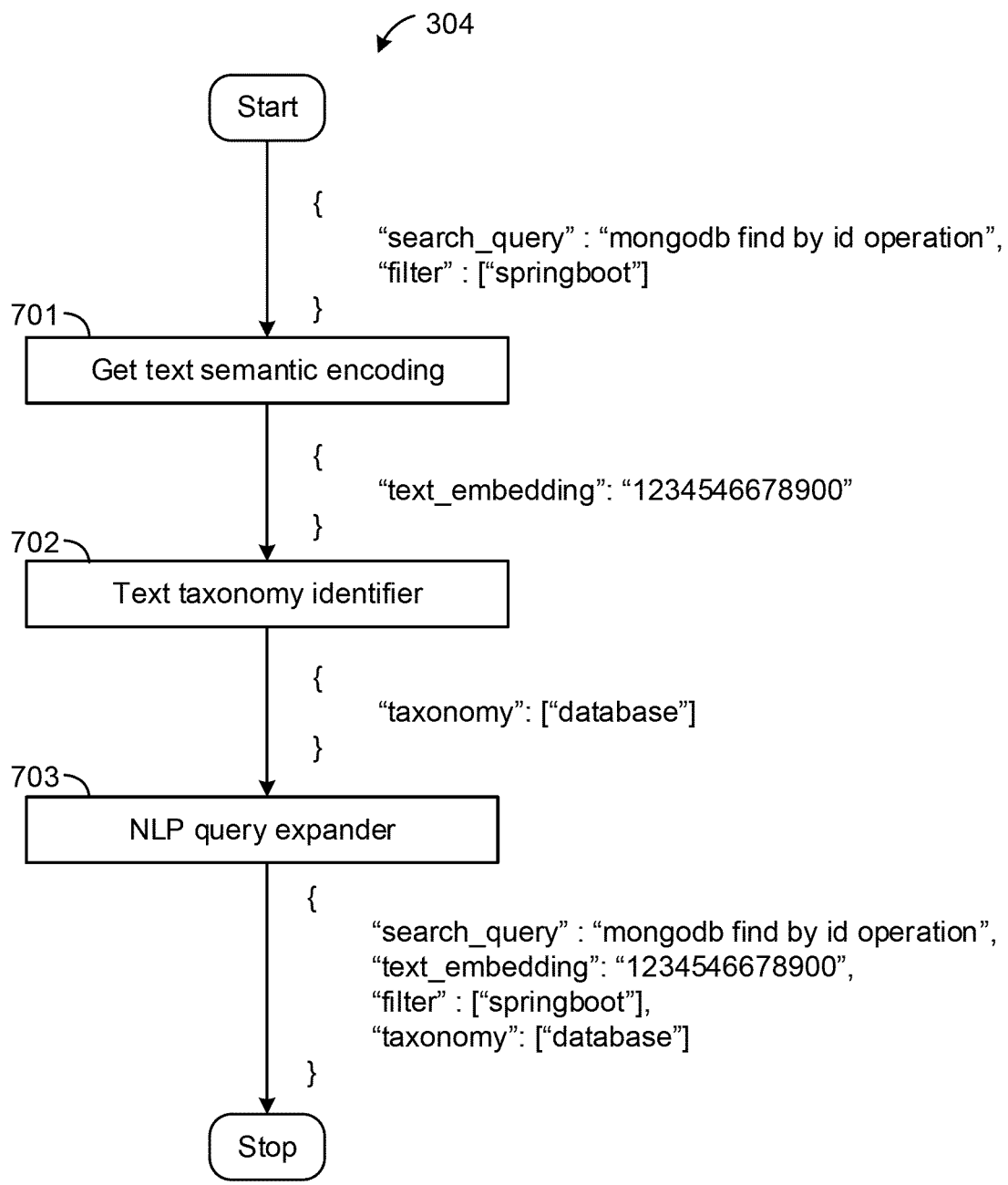
FIG. 7 illustrates a flow diagram of how a natural language query can be parsed for software search need, according to some embodiments.

FIG. 7 illustrates step 304 of process 300 in greater detail, depicting how a natural language query can be parsed for a software search for the specific purpose of enhancing natural language details, according to some embodiments. In step 701 a transformer based natural language processing model that is trained on the software technology dataset such as readme file, public technology question and answer website data is used to generate encoding vector for a search query based on an input of a search query and a filter. The generated encoded vector is used to do semantic search and match in the search process. Step 701 produces an embedding vector for the given search query as output.

In some embodiments, in step 702 a machine learning technique is used to identify technology category of the search query based on multi label classification model trained on the technology documentation such as readme file, technology question and answer websites. Step 702 receives the output of step 701 and is completed as part of enhancing natural language details. For example, for a search query "mongodb find by id operation" taxonomy is identified as "database." This taxonomy helps to narrow the scope of search in the multi-source search process. Step 702 produces taxonomy of the given search query in the output.

In some embodiments, in step 703 a low-level search query for the downstream semantic search process is generated as part of enhancing natural language details, according to some embodiments. Step 703 accepts the output of steps 701 and 702 and produces four output fields: search text with the filer term removed from the search text; text embedding which is used to do semantic search; filter which helps to narrow down the search process; and taxonomy which further narrows down the search process and relevance ranking.

Figure 8:
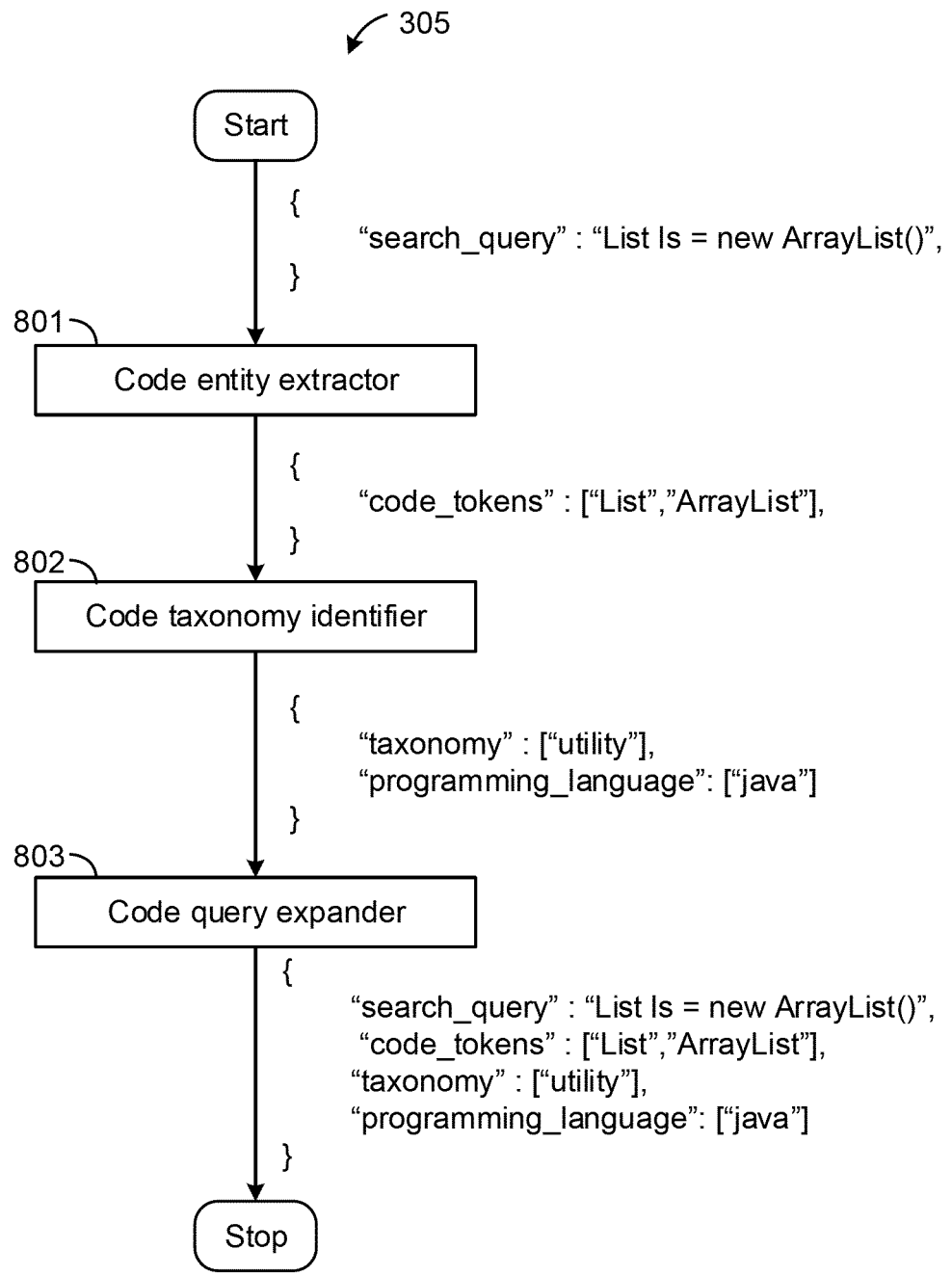
FIG. 8 illustrates a flow diagram of how a programming language code type of query can be parsed for software code search need, according to some embodiments.

FIG. 8 illustrates step 305 of process 300 in greater detail, depicting how a programming language code type of query can be parsed for software code search for the specific purpose of enhancing code details, according to some embodiments. In step 801, programming entities are extracted from a search query of a programming code construct type. For example, step 801 is performed only when the search query type is determined in step 503 depicted in FIG. 5 to be "code." In step 801 a machine learning technique such as entity extraction (e.g., an entity extraction model) is used to extract the entities from the code type of search query. The Entity extraction model is trained on the programming source code data from public repositories, for example, GitHub, Gitlab, etc., across difference programming languages, for example, java, python, ruby, c#, etc. For example, if a search query "List is =new ArrayList( )" is passed, program entities "List" and "ArrayList" will be extracted from the search query in step 801. Step 801 generates a list of code entities identified as output.

In some embodiments, in step 802, a multi label classification machine learning model trained on programming language data is used to identify technology category (e.g., a taxonomy) as well as programming language. Step 802 is performed as part of enhancing code details and receives the output from step 801 as input. For example, if code entities "List" and "ArrayList" are passed, a "utility" taxonomy and a "java" programming language are identified. Step 801 produces two output fields: taxonomy, which is the technology category of the search query; and programming language, which is generally the programming language the search query belongs to.

In some embodiments, step 803 in the sub process of step 305 receives the data from step 801, step 802, and the search query. Step 803 helps to build a low-level search query for the downstream code search process. Step 803 produces four output fields; search query of programming code construct, list of code entities, taxonomy that further narrows down the search process and relevance ranking, programming language that helps to filter and narrow down the search process.

Figure 9:
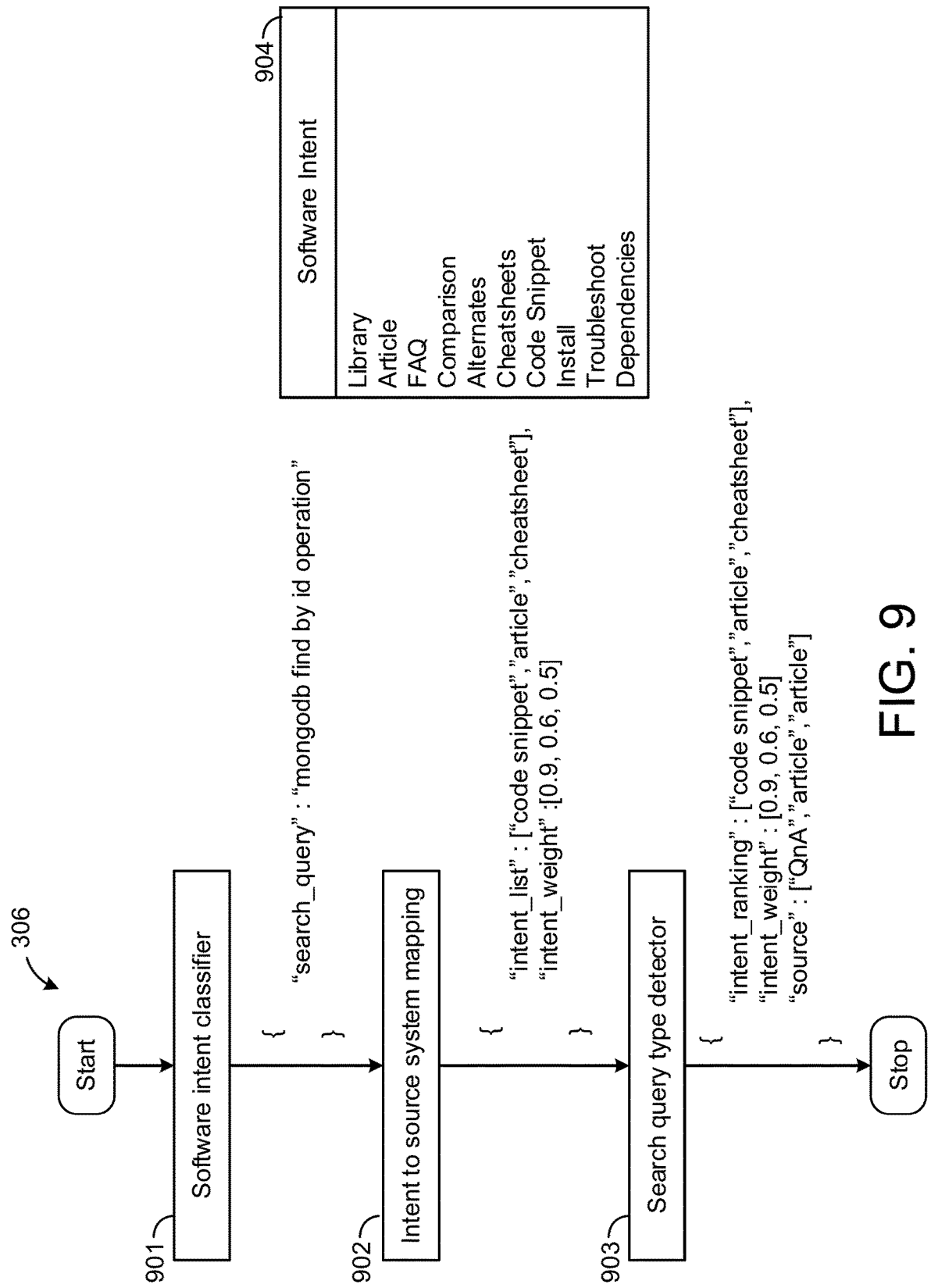
FIG. 9 illustrates a flow diagram of software intent classifier, according to some embodiments.

FIG. 9 illustrates step 306 of process 300 in greater detail, depicting how to identify the intent ranking from the search query for the specific purpose of performing entity ranking and weight assignment, according to some embodiments. In step 901, the software intent of the search query may be classified based on one or more of software intents 904 including "library," "article," "FAQ," "comparison," "alternates," "cheatsheets," "code snippets," "installs," "troubleshoots," and "dependencies."

In some embodiments, in step 901, a machine learning model trained on search query generated from technology documentation as well as search query from the search history is used to classify software intent. In step 901, the intents are ranked based on a confidence score threshold. For example, search query "mongodb find by id operation" the intents are ranked as "code snippet", "article" and "cheatsheet" and intents corresponding weights are "0.9", "0.6" and "0.5" respectively. The three intents mentioned here are meeting the confidence score threshold limit of 0.5 and above. Other intents are not included here as those intents are not meeting the threshold limit. Step 901 produces two fields as output: intent list, which is basically a ranked intent list based on threshold limit; and intent weight, which is weight corresponding the each intent listed in the intent list field.

In some embodiments, in step 902, the identified software intents are mapped to a software source as part of entity ranking and assignment. Step 902 receives the output from step 901 as input and is performed based on rules for mapping the intent to corresponding search source system. Some of the search source systems are "Library", "Source Code", "Question and Answer", "Security" and "Article". For example, for search query intents such as "code snippet", "article" and "cheatsheet" step 902 maps to corresponding source systems such as "Question and Answer", "article," and "article," respectively. Step 902 produces three fields as output: an intent list, which is a ranked intent list based on threshold limit; intent weight, which is weight corresponding to the each intent listed in the intent list field; and source, which is the mapping of source identifiers for the corresponding intent list identified.

Figure 10:
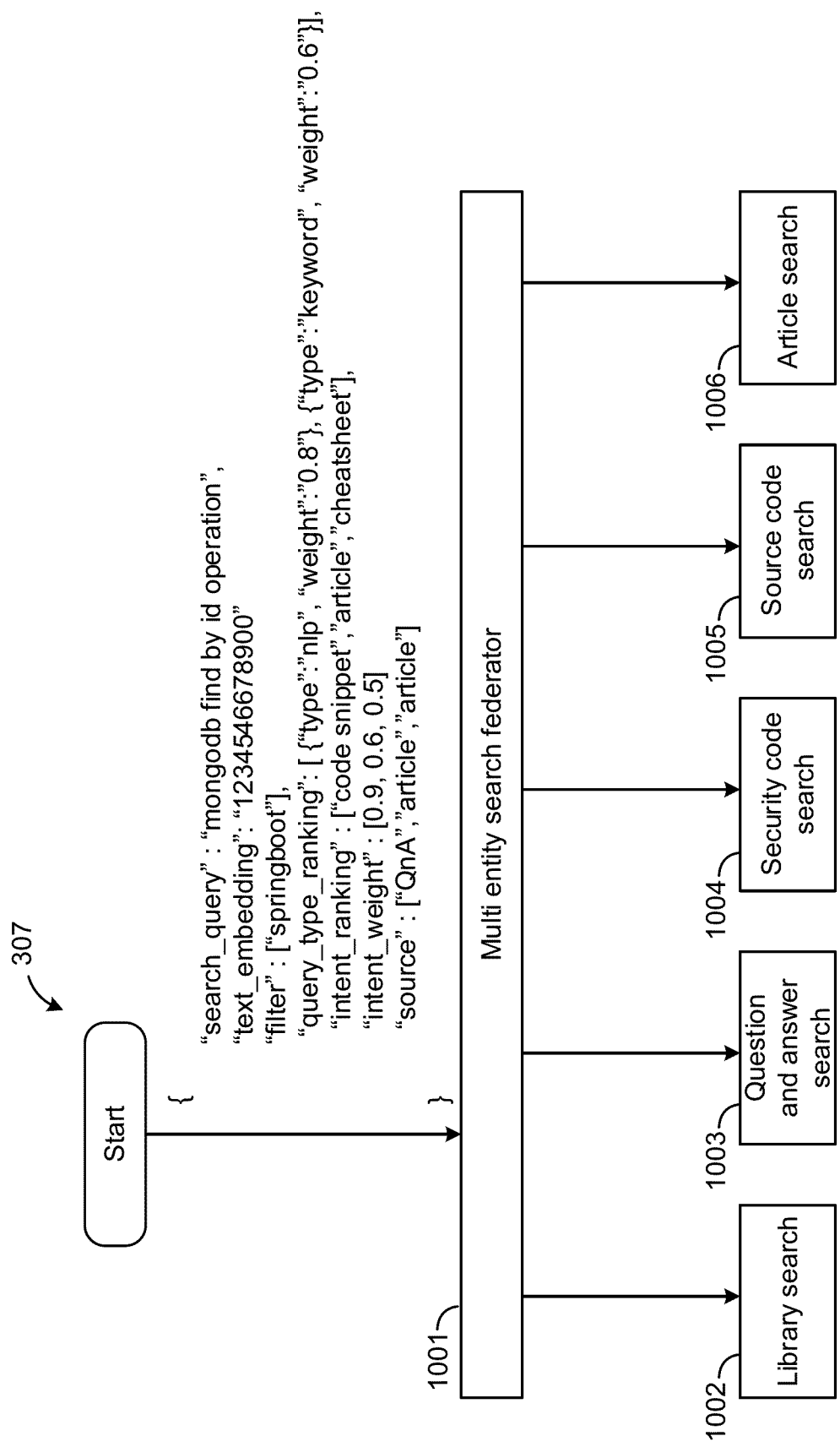
FIG. 10 illustrates a flow diagram of multi entity search federator, according to some embodiments.

FIG. 10 illustrates step 307 of process 300 in greater detail, depicting a performance of multi-searching, according to some embodiments. Step 1001 performs the multi-search process and may completed by a "Multi Search Federator." In step 1001, the Multi Entity Search Federator receives the following data as input.

```
{
  "search_query" : "mongodb find by id operation",
  "text_embedding": "1234546678900"
```

```
"filter" : ["springboot"],
"query_type_ranking": [ {"type":"nlp", "weight":"0.8"}, {"type":"keyword",
"weight":"0.6"}],
"intent_ranking" : ["code snippet","article","cheatsheet"],
"intent_weight" : [0.9, 0.6, 0.5]
"source" : ["QnA","article","article"]
}
```

In some embodiments, in step 1001, the Multi Entity Search Federator calls different search systems 1002-1006 including, but not limited to "Library Search," "Question and Answer Search," "Security Code Search," "Source Code Search," and "Article Search" in parallel based on the source parameter. The Multi Entity Search Federator combines the weight of query type ranking and intent weight and normalises it to use it for ranking.

For example, in step 1001, for the sample search query "mongodb find by id operation", the query type ranking weights are 0.8 for "nlp" and 0.6 for "keyword". The intent weight for source systems are 0.9 for "QnA", 0.6 for "article" and 0.5 for "article". The Multi Entity Search Federator adds weight (0.8) of "nlp" with the weight (0.9) of "QnA" and normalizes it to unit variation. The Multi Entity Search Federator makes a semantic code snippet call to Question-and-Answer search system with the normalized weight for relevance ranking. Similarly, the Multi Entity Search Federator does a semantic search call for other sources based on their weight in parallel. Since the query type ranking also suggests type "keyword" with weight, keyword-based searches also occur on the sources based on their weights in parallel As will be appreciated by one of skill in the art, the present disclosure may be embodied as a method and system. Accordingly, the present disclosure may take the form of an entirely hardware embodiment, a software embodiment or an embodiment combining software and hardware aspects. It will be understood that the functions of any of the units as described above can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts performed by any of the units as described above.

Instructions may also be stored in a computer-readable memory that can direct a computer or other programmable data processing apparatus to function in a particular manner, such that the instructions stored in the computer-readable memory produce an article of manufacture including instruction means which implement the function/act performed by any of the units as described above.

Instructions may also be loaded onto a computer or other programmable data processing apparatus like a scanner/check scanner to cause a series of operational steps to be performed on the computer or other programmable apparatus to produce a computer implemented process such that the instructions which execute on the computer or other programmable apparatus provide steps for implementing the functions/acts performed by any of the units as described above.

In the specification, there has been disclosed exemplary embodiments of the invention. Although specific terms are employed, they are used in a generic and descriptive sense only and not for purposes of limitation of the scope of the invention.

What is claimed is:

1. A system for parsing a software component search query to enable multi entity searches, the system comprising:
one or more processors and memory storing instructions that, when executed by the one or more processors, cause the one or more processors to perform operations comprising:
filtering a search query for a plurality of unwanted characters;
applying a software dictionary of terms to correct a spelling of the search query;
training a plurality of machine learning models using respective sets of data;
applying a first machine learning model of the plurality of machine learning models to remove one or more filter terms from the search query;
parsing the search query to extract a plurality of entities;
categorizing a first entity of the plurality of entities as natural language, categorizing a second entity of the plurality of entities as programming language, and categorizing a third entity of the plurality of entities as keyword text;
applying a second machine learning model of the plurality of machine learning models to the first entity categorized as natural language to enhance one or more search characteristics of the first entity categorized as natural language;
applying a third machine learning model of the plurality of machine learning models to the second entity categorized as programming language to enhance one or more search characteristics of the second entity categorized as programming language;
applying a fourth machine learning model of the plurality of machine learning models to the third entity categorized as keyword text to enhance one or more search characteristics of the third entity categorized as keyword text;
consolidating the plurality of entities into an enhanced search query comprising the one or more search characteristics of the first entity, the one or more search characteristics of the second entity, and the one or more search characteristics of the third entity;
applying a fifth machine learning model of the plurality of machine learning models to determine one or more intended sources for the enhanced search query; and
searching the one or more intended sources using the enhanced search query to generate and present a plurality of results pertaining to the enhanced search query.

2. The system of claim 1, the operations further comprising accepting a remote location of the search query via a web GUI portal that allows a user to input the search query.

3. The system of claim 1, the operations further comprising assigning a search weight to each of the plurality of entities based on a categorization of each of the plurality of entities, wherein searching the one or more intended sources for the plurality of results pertaining to the enhanced search query is prioritized based on each of the search weights.

4. The system of claim 1, the operations further comprising assigning a search weight to each of the one or more intended sources based on the plurality of entities, wherein searching the one or more intended sources for the plurality of results pertaining to the enhanced search query is prioritized based on each of the search weights.

5. The system of claim 1, the operations further comprising identifying a technology category for the search query, wherein the technology category is applied to remove one or more of the intended sources for the search query that are not associated with the technology category.

6. The system of claim 1, wherein the fourth machine learning model is configured to remove one or more technology stop words.

7. The system of claim 1, the operations further comprising identifying a programming language for the search query, wherein the programming language is applied to remove one or more of the intended sources for the search query that are not associated with the programming language.

8. A method for parsing a software component search query to enable multi entity searches, the method comprising:
   filtering a search query for a plurality of unwanted characters;
   applying a software dictionary of terms to correct a spelling of the search query;
   training a plurality of machine learning models using respective sets of data;
   applying a first machine learning model of the plurality of machine learning models to remove one or more filter terms from the search query;
   parsing the search query to extract a plurality of entities;
   categorizing a first entity of the plurality of entities as natural language, categorizing a second entity of the plurality of entities as programming language, and categorizing a third entity of the plurality of entities as keyword text;
   applying a second machine learning model of the plurality of machine learning models to the first entity categorized as natural language to enhance one or more search characteristics of the first entity categorized as natural language;
   applying a third machine learning model of the plurality of machine learning models to the second entity categorized as programming language to enhance one or more search characteristics of the the second entity categorized as programming language;
   applying a fourth machine learning model of the plurality of machine learning models to the third entity categorized as keyword text to enhance one or more search characteristics of the third entity categorized as keyword text;
   consolidating the plurality of entities into an enhanced search query comprising the one or more search characteristics of the first entity, the one or more search characteristics of the second entity, and the one or more search characteristics of the third entity;
   applying a fifth machine learning model of the plurality of machine learning models to determine one or more intended sources for the enhanced search query; and
   searching the one or more intended sources using the enhanced search query to generate and present a plurality of results pertaining to the enhanced search query.

9. The method of claim 8, further comprising accepting a remote location of the search query via a web GUI portal that allows a user to input the search query.

10. The method of claim 8, further comprising assigning a search weight to each of the plurality of entities based on a categorization of each of the plurality of entities, wherein searching the one or more intended sources for the plurality of results pertaining to the enhanced search query is prioritized based on each of the search weights.

11. The method of claim 8, further comprising assigning a search weight to each of the one or more intended sources based on the plurality of entities, wherein searching the one or more intended sources for the plurality of results pertaining to the enhanced search query is prioritized based on each of the search weights.

12. The method of claim 8, further comprising identifying a technology category for the search query, wherein the technology category is applied to remove one or more of the intended sources for the search query that are not associated with the technology category.

13. The method of claim 8, wherein the fourth machine learning model is configured to remove one or more technology stop words.

14. The method of claim 8, further comprising identifying a programming language for the search query, wherein the programming language is applied to remove one or more of the intended sources for the search query that are not associated with the programming language.

15. One or more non-transitory computer-readable media for parsing a software component search query to enable multi entity searches, the non-transitory computer-readable media storing instructions thereon, wherein the instructions when executed by one or more processors, cause the one or more processors to:
   filter a search query for a plurality of unwanted characters;
   apply a software dictionary of terms to correct a spelling of the search query;
   train a plurality of machine learning models using respective sets of data;
   apply a first machine learning model of the plurality of machine learning models to remove one or more filter terms from the search query;
   parse the search query to extract a plurality of entities;
   categorize a first entity of the plurality of entities as natural language, categorize a second entity of the plurality of entities as programming language, and categorize a third entity of the plurality of entities as keyword text;
   apply a second machine learning model of the plurality of machine learning models to the first entity categorized as natural language to enhance one or more search characteristics of the first entity categorized as natural language;
   apply a third machine learning model of the plurality of machine learning models to the second entity categorized as programming language to enhance one or more search characteristics of the the second entity categorized as programming language;
   apply a fourth machine learning model of the plurality of machine learning models to the third entity categorized as keyword text to enhance one or more search characteristics of the third entity categorized as keyword text;

consolidate the plurality of entities into an enhanced search query comprising the one or more search characteristics of the first entity, the one or more search characteristics of the second entity, and the one or more search characteristics of the third entity;

apply a fifth machine learning model of the plurality of machine learning models to determine one or more intended sources for the enhanced search query; and search the one or more intended sources using the enhanced search query to generate and present a plurality of results pertaining to the enhanced search query.

16. The non-transitory computer-readable media of claim 15, wherein the instructions cause the one or more processors to accept a remote location of the search query via a web GUI portal that allows a user to input the search query.

17. The non-transitory computer-readable media of claim 15, wherein the instructions cause the one or more processors to assign a search weight to each of the plurality of entities based on a categorization of each of the plurality of entities, wherein searching the one or more intended sources for the plurality of results pertaining to the enhanced search query is prioritized based on each of the search weights.

18. The non-transitory computer-readable media of claim 15, wherein the instructions cause the one or more processors to assign a search weight to each of the one or more intended sources based on the plurality of entities, wherein searching the one or more intended sources for the plurality of results pertaining to the enhanced search query is prioritized based on each of the search weights.

19. The non-transitory computer-readable media of claim 15, wherein the instructions cause the one or more processors to identify a technology category for the search query, wherein the technology category is applied to remove one or more of the intended sources for the search query that are not associated with the technology category.

20. The non-transitory computer-readable media of claim 15, wherein the fourth machine learning model is configured to remove one or more technology stop words.

* * * * *